July 3, 1962
H. E. BRYS
3,042,861
CONTINUOUS RESISTIVITY GAUGE
Filed July 24, 1958
2 Sheets-Sheet 1
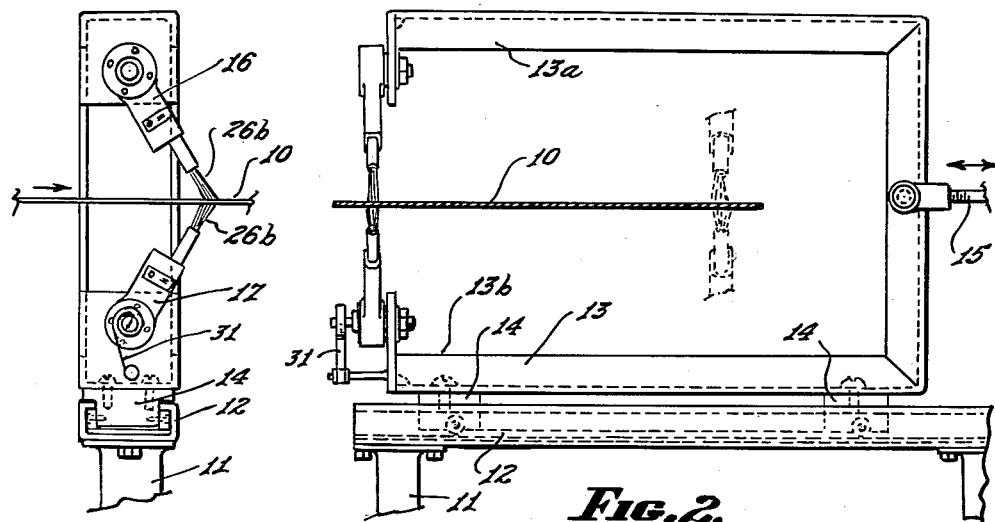
FIG.1.
FIG.2.
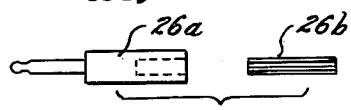
FIG.8.
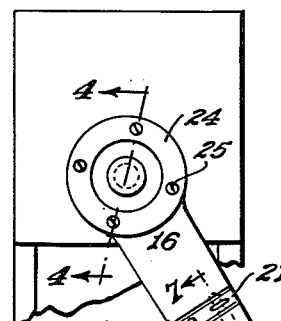
FIG.3.
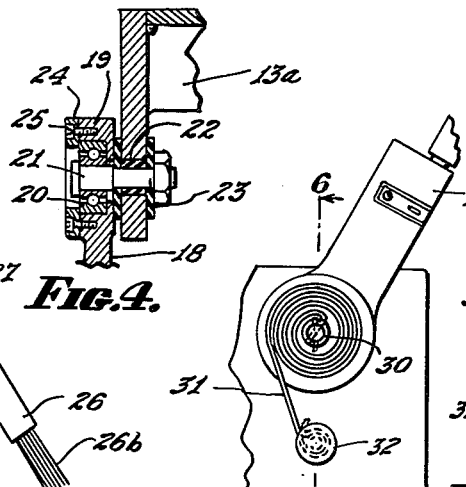
FIG.4.
FIG.7.
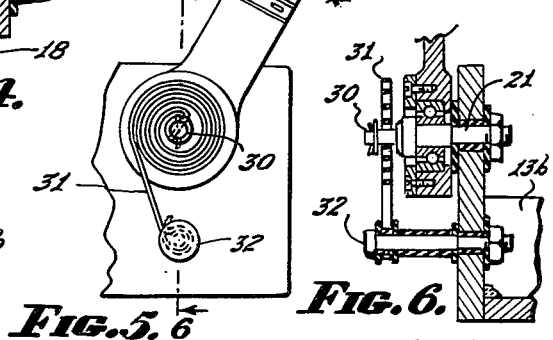
FIG.5.
FIG.6.
INVENTOR.
HARRY EUGENE BRYS,
BY
ATTORNEYS.

United States Patent Office 3,042,861
Patented July 3, 1962

3,042,861
CONTINUOUS RESISTIVITY GAUGE
Harry Eugene Brys, Butler, Pa., assignor to Armco Steel Corporation, Middletown, Ohio, a corporation of Ohio
Filed July 24, 1958, Ser. No. 750,787
16 Claims. (Cl. 324—62)

This invention relates to a continuous resistivity gauge by means of which it is possible to measure the surface resistivity of insulating films on steel strip or sheet.

In the field of electrical steels or steels which are to be used in the manufacture of laminations for electric motors, transformers and the like, it is conventional to provide the steel strip with an insulative coating. This coating has generally been a so-called glass film and in some cases it is a phosphate type of coating. In any event, and regardless of the type of insulating material with which the sheet or strip is coated, a certain surface resistivity is often specified and must be maintained. It has heretofore been the custom to spot-check the finished material and it has never been possible to continuously measure and record the surface resistivity of a moving strip.

The major problem encountered in attempts to measure the surface resistivity of a moving strip is the matter of contacting the strip so that a voltage may be applied to it. Wheels or rolls of various sorts have proved unsuccessful because they pick up foreign matter from the strip and the resulting measurements have proved unreliable. The same is true of ball bearings. Other devices such as carbon brushes contaminate the surface of the strip and generally damage the insulative coating on the strip. The latter objection is encountered with any kind of solid brushes or sliding contacts. They have a tendency to damage the insulation and they cannot adjust themselves to minor irregularities of the strip surface.

With the foregoing considerations in mind, it is an object of the present invention to provide an apparatus which will successfully measure the surface resistivity of a moving sheet or strip. In this connection, it is an ancillary object to provide a novel strip contacting element which will adjust itself to irregularities of the strip surface and which will have sure contact with the strip surface but which will not damage the insulative coating on the surface.

It is another object of the invention to provide a novel mounting for contacting elements which further insure against damage of the insulative coating.

Still another object of the invention involves the provision of an apparatus for causing the contacting elements to skim the surface of the strip as it is moving so as to give readings not only over the length of the strip but also transversely of its width.

Still another object of the invention involves the provision of an apparatus whereby under the control of a switch a reading may be obtained of the total resistivity through the coatings on both sides of the strip or whereby individual measurements of the coatings on the two sides of the strip may be obtained concurrently.

These and other objects of the invention, which will be pointed out in more detail hereinafter or which will be apparent to one skilled in the art upon reading these specifications, are accomplished by that construction and arrangement of parts of which the following is an exemplary embodiment.

Reference is made to the drawings forming a part hereof and in which:

FIGURE 1 is an elevational view (transversely of the strip) showing the mounting of the contact elements.

FIGURE 2 is an elevational view (longitudinally of the strip) showing the C-frame on which the contact elements are mounted.

FIGURE 3 is a fragmentary enlarged view of the upper contact element similar to FIGURE 1.

FIGURE 4 is a fragmentary cross-sectional view taken on the line 4—4 of FIGURE 3.

FIGURE 5 is a fragmentary enlarged view similar to FIGURE 1 showing the lower contacting element.

FIGURE 6 is a fragmentary cross-sectional view taken on the line 6—6 of FIGURE 5.

FIGURE 7 is a fragmentary cross-sectional view on an enlarged scale taken on the line 7—7 of FIGURE 3.

FIGURE 8 is an exploded view of one of the brushes; and

Figure 9:
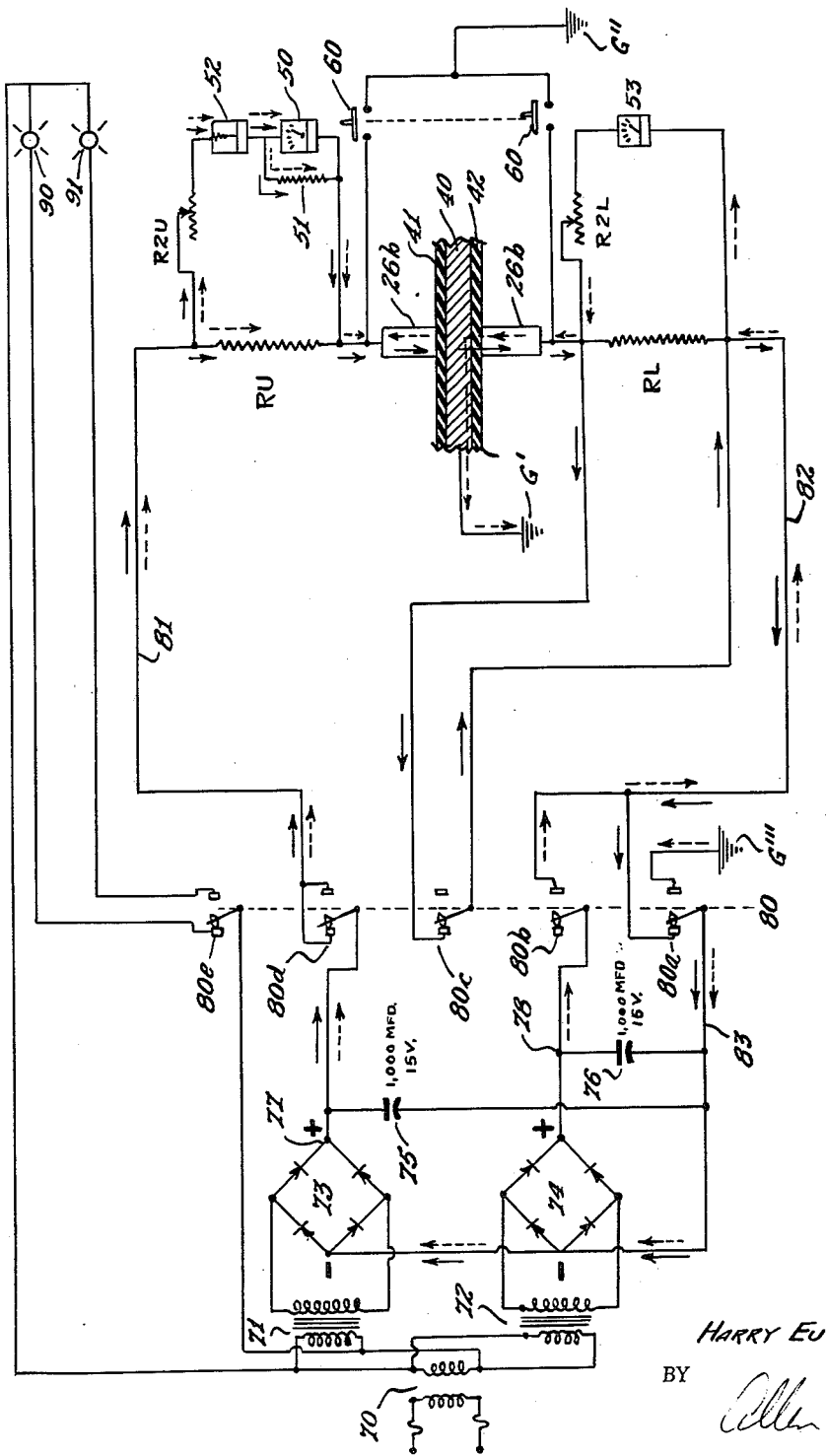
FIGURE 9 is a circuit diagram of the invention.

Briefly, in the practice of the invention, there is provided a C-frame which may be mounted for movement transversely of the strip or sheet being measured. Means may be provided for reciprocating the C-frame at a desired rate. One limb of the frame extends over the strip and the other extends under the strip. On the end of each limb is mounted a contacting element and the contacting element comprises a brush composed of fine metallic wire. Means are provided to yieldingly urge the brushes against the traveling strip. An electric circuit is provided whereby filtered direct current may be applied to the brushes either in series or in parallel and the resistivity of either or both coatings is measured by means of an ohmmeter circuit.

Referring now more in detail to the drawings, the strip being tested is indicated at 10. It will be understood that wherever the term "strip" is used herein, it is intended to include sheet material since the distinction between sheet and strip is merely one of length. A frame element 11 provides a track 12 upon which the C-frame 13 may reciprocate. The frame 13 may be provided with shoes 14 suitably secured thereto with rollers engaging the track 12. This particular mounting is, of course, exemplary only. A link 15 is suitably connected to the frame 13 as indicated in FIGURE 2. By any suitable drive mechanism (not shown) the frame 13 may be caused to reciprocate in the direction of the arrows in FIGURE 2. The frame 13, as will be clear from FIGURES 1 and 2, has an upper limb 13a and a lower limb 13b and at the free end of each of the limbs 13a and 13b a supporting element is mounted. The upper supporting element is indicated generally at 16 and the lower supporting element at 17. The upper element 16 is shown in more detail in FIGURES 3 and 4 and it will be observed that it comprises an arm 18 having a hub 19. The hub 19 is provided with the ball bearing 20, the inner race of which is mounted on the pin 21. The pin 21 is held in an insulated bushing 22 in the limb 13a of the C-frame 13 by means of a nut 23. A collar 24 secured in position by the screws 25 holds the outer ball bearing race in the hub 19. Thus, the arm 18 is very freely pivotable on the pin 21.

Supported on the arm 18 is the brush or contacting element generally indicated at 26. As best seen in FIGURE 8, the member 26 may comprise a special all metal plug similar to a phone jack 26a in which the "bristles" 26b are secured. The element 26 is shown in FIGURE 7 to be secured to the arm 18 by pushing it into a hole in the arm 18 so that the neck 26c of the plug is engaged by the spring member 27. The spring member 27 is secured in place by the screw 28.

From the foregoing it will be clear that in order to change brushes, it is only necessary to pull out the element 26 and replace it with another and this can be accomplished in a matter of seconds.

The lower supporting element 17 is shown in detail in FIGURES 5 and 6 and it is substantially identical to the member 16 except that the pin 21 is provided with an extension 30 to which is secured one end of a spiral spring 31. The other end of the spring 31 is secured to a stud 32 mounted on the arm 13b. In other respects, the member 17 may be identical with the member 16. The spring 31 causes the arm 17 to be rocked in a counter-clockwise direction as seen in FIGURES 1 and 5, to cause the brush to bear lightly against the underside of the strip 10. In the particular embodiment shown, the upper brush is urged against the upper side of the strip 10 by gravity. It will of course be understood that a spring mounting may also be provided for the upper brush and it will be clear that if the measurement is being conducted while the strip is moving in a vertical path, both of the brushes may be spring urged or both may be gravitationally urged against the strip.

The brush itself, indicated at 26b, is composed of fine wire. The wire is preferably of brass or other suitable electrically conductive material with the individual wires having a diameter of .005 inch or less, which is herein referred to as fine metallic wire. Fifteen hundred strands makeup a suitable brush.

Coming now to a description of FIGURE 9, the brushes 26b have been indicated diagrammatically as being in contact with a strip 40 having an insulative coating 41 on its upper side and an insulative coating 42 on its lower side. Means are provided, as indicated at G', to ground the strip 40. The strip is usually grounded by the slitter or side trimmer knives, burr masher rolls, or by the pay-off reel rubbing the edge of the strip.

Associated with the upper brush 26b is a resistor RU and associated with the lower brush 26b is a resistor RL. It is clear from FIGURE 9 that these resistors are in series with the respective brushes 26b.

Associated with the resistor RU and in parallel therewith are the zero adjusting resistor RZU, the ohmmeter 50, the shunting resistor 51, and recorder 52. Similarly, associated with the lower resistor RL is the zero adjusting resistor RZL, and the ohmmeter 53.

For purposes of calibration, means are provided to shunt out the brushes 26b and the strip and these means comprise the momentary contact switch 60 by means of which a connection from RU and RL may be made directly to ground G" or from RU to RL.

An alternating current voltage is supplied to the apparatus by a suitable regulator 70. The regulated alternating current is applied to the step-down transformers 71 and 72 which step the voltage down to a safe value for the ohmmeters 50 and 53. The low A.C. voltage from the transformers 71 and 72 is full-wave rectified by the magnesium oxide rectifiers 73 and 74. Filter capacitors 75 and 76 provide filtered direct current at the points 77 and 78. The current supply outlined above eliminates interaction between the ohmmeters and eliminates the need for battery replacement.

At 80 there is indicated a five-wafer two-position gang switch having the elements 80a, 80b, 80c, 80d and 80e. The switch 80 is shown in the left position, in which position the circuit is arranged to measure total resistance which is the sum of the resistances of the two insulating films 41 and 42. When the gang switch 80 is moved to the other position simultaneously individual readings of the resistance of the individual coatings 41 and 42 are obtained.

With the switch 80 in the position shown in FIGURE 9, it will be seen that the filtered rectified voltage at 77 passes through the element 80d, the line 81, the resistor RU, the upper brush 26b, the coating 41, the strip 40, the coating 42, the lower brush 26b, element 80c, and through the line 82, through the element 80a to the negative D.C. line 83. The IR drop across the resistor RU is determined by the sum of the resistance of the films 41 and 42 and is measured by the ohmmeter circuit described above and traced by the recorder 52.

When the switch 80 is thrown to the other position, the resistivity of the coatings 41 and 42 is measured individually and simultaneously. The resistivity of the coating 41 is measured by the following circuit: from the point 77 through 80d, 81, RU, upper brush 26b, coating 41, strip 40, to ground G' and from G''' and element 80a and line 83 to the negative tap of the rectifier 73.

The resistivity of the film 42 is measured by the circuit beginning with the positive tap of the rectifier 74 from point 78 through 80b, line 82, resistor RL, lower brush 26b, coating 42, strip 40, to ground G', ground G''', element 80a, line 83 to the negative tap of the rectifier 74. With the switch in this right-hand position, milliammeter 50 indicates the resistivity of the coating 41 and the milliammeter 53 indicates the resistivity of the coating 42. These indications are made simultaneously.

Since the device of the present invention is intended to constantly scan the strip and it is not desirable to remove the gauge from the strip, there is provided the zero calibration circuit operated by the momentary contact switch 60. The switch 60 is closed momentarily, the brushes 26b are connected to ground G" or to each other, thereby shunting them out, and under these conditions the instrument may be calibrated for zero by adjustment of the resistors RZU and RZL. By this means, it is also possible to compare actual zero at the brushes so that brush contact resistance may be checked.

The lines indicated at 90 and 91 are simply indicators to give a visual indication of the position of the gang switch 80.

It will be clear that the function of the wafer 80c of the switch 80 is simply to cut out the resistor RL and the resistor RZL and the milliammeter 53 when total ressitivity is being measured.

To assist in understanding the diagram, the solid arrows indicate the direction of current flow with the switch 80 in the first position and the dotted arrows indicate the direction of current flow with the gang switch 80 in the second position.

It will be understood that various modifications may be made without departing from the spirit of the invention. Thus, the strip may be tested while moving in a vertical path as well as moving in a horizontal path. The device of the present invention may be incorporated in a portable instrument or it may be permanently mounted as described herein. The details of the mounting of the brushes may of course be varied within the scope of the invention but the use of fine wire in the brushes is considered to be important because such a brush will not contaminate the strip and it has a self-wipe action. It is caused to bear against the strip at a known pressure and at a specified angle so that a constant degree of contact is established and the insulative coating is not damaged.

No limitation is therefore to be imported into the claims unless specifically set out therein.

What is claimed is:

1. In an apparatus for continuously measuring the surface resistivity of a metallic strip having an electrically resistive coating, mounting means adjacent said strip, means for reciprocating said mounting means transversely to said strip to scan the same, a yieldable support mounted on said mounting means, a strip contacting brush supported on said yieldable support, said contacting brush comprising a shank and a bunch of fine metallic wires held in said shank, said shank and yieldable support having cooperating means for releasably holding said shank on said yieldable support.

2. Apparatus according to claim 1, wherein said wires are of brass and have a diameter not in excess of .005 inch.

3. Apparatus according to claim 1, wherein snap fastening means are provided for securing said shank to said yieldable support.

4. Apparatus according to claim 1, wherein said yieldable support comprises an anti-friction pivoted bearing about which said support may rock.

5. Apparatus according to claim 4, including means urging said support to rock yieldingly toward said strip.

6. In an apparatus for continuously measuring the surface resistivity of a metallic strip having an electrically resistive coating, a C-frame having limbs, means for positioning a strip between said limbs, whereby the limbs of said C-frame extend respectively over the two sides of the strip being tested, means for reciprocating said frame transversely of said strip to scan the same, a yieldable support mounted on each of said limbs, a strip contacting brush supported on each of said yieldable supports, said brushes being in alignment with each other, each of said contacting brushes comprising a shank holding a bunch of fine metallic wires, said shanks and yieldable supports respectively having cooperating means for releasably holding said shanks on said yieldable supports.

7. Apparatus according to claim 6, wherein said wires are of brass and have a diameter not in excess of .005 inch.

8. Apparatus according to claim 6, wherein snap-fastening means are provided for securing said shanks respectively to said yieldable supports.

9. Apparatus according to claim 8, wherein said wires are of brass and of a diameter not in excess of .005 inch.

10. Apparatus according to claim 6, wherein one at least of said yieldable supports comprises an anti-friction pivoted bearing about which said support may rock, and means urging said support to rock yieldingly toward said strip.

11. Apparatus according to claim 10, wherein said last mentioned means comprises a spiral spring.

12. Apparatus for measuring the surface resistivity of a metallic strip having electrically resistive coating on both sides, comprising two contact brushes, one arranged to ride on each side of said strip, said brushes each comprising a shank holding a bunch of fine metallic wires, said shanks being snap-fastened to yieldable supports, means for reciprocating said contact brushes and yieldable supports transversely to said strip to scan the same, means electrically grounding the said strip, a source of filtered direct current, two resistors, one in series electrical connection with each of said contact elements and said source, an ohmmeter circuit connected to each of said resistors for measuring the IR drop across the respective resistor, and two-position switch means in said circuit arranged in one position to cause said current to flow through the coating on one side of said strip, the strip itself and the coating on the other side of the strip, and also in said one position to cut out one of said resistors and the ohmmeter circuit associated therewith, whereby to give on the ohmmeter which is not cut out, an indication of total resistivity of said coatings, and in the other position to cause said current to flow in parallel through the respective coatings on the two sides of the strip and through the respective resistors into the strip and to ground whereby simultaneously to give indications of the resistivity of each of said coatings on the respective ohmmeters.

13. Apparatus according to claim 12, including means for shunting out said contact elements whereby said ohmmeter circuits may be calibrated for zero while a strip is passing through the apparatus.

14. Apparatus according to claim 12, wherein said source of current is constituted by a source of regulated alternating current, a step-down transformer to reduce the voltage to a low value for said ohmmeters, a rectifier to provide full wave rectification, and a filter capacitor to filter the rectified voltage.

15. Apparatus according to claim 12, wherein said source of current is constituted by a source of regulated alternating current, two step-down transformers connected to said source in parallel to reduce the voltage to a low value for said ohmmeters, two magnesium oxide rectifiers, one connected across the secondary of each of said transformers to provide full wave rectification for the voltage produced by each of said transformers, and two filter capacitors connected respectively to said rectifiers to filter the rectified voltage produced by said rectifiers, said switch means in said one position being arranged to cause the voltage from one of said rectifiers to be applied to a circuit including both resistors, contact elements and the coatings on both sides of the strip, and in the other position to apply the rectified voltage from one of said rectifiers to a circuit including one of said resistors, one of said contact elements and the coating on one side of the strip, and from the other of said rectifiers to a circuit including the other of said resistors, the other of said contact elements and the coating on the other side of the strip.

16. Apparatus for measuring the surface resistivity of a metallic strip having an electrically resistive coating on both sides, comprising two contact brushes, one arranged to be brought into contact with each side of said strip, said brushes each comprising a shank holding a bunch of fine metallic wires, said shanks being snap-fastened to yieldable supports, means for reciprocating said contact brushes transversely to said strip to scan the same, means electrically grounding the said strip, a source of filtered direct current, two resistors, one in series electrical connection with each of said contact elements and said source, an ohmmeter circuit connected to each of said resistors for measuring the IR drop across the respective resistor, and two-position switch means in said apparatus arranged in one position to cause said current to flow through the coating on one side of said strip, the strip itself and the coating on the other side of the strip, and also in said one position to cut out one of said resistors and the ohmmeter circuit associated therewith, whereby to give on the ohmmeter which is not cut out, an indication of total resistivity of said coatings, and in the other position to cause said current to flow in parallel through the respective coatings on the two sides of the strip and through the respective resistors into the strip and to ground, whereby simultaneously to give indications of the resistivity of each of said coatings on the respective ohmmeters.

References Cited in the file of this patent

UNITED STATES PATENTS

| | | |
|---|---|---|
| 1,815,915 | Kallander | July 28, 1931 |
| 2,008,046 | Snelling | July 16, 1935 |
| 2,086,060 | Appleyard et al. | July 6, 1937 |
| 2,157,973 | Wenger | May 9, 1939 |
| 2,197,823 | Young | Apr. 23, 1940 |
| 2,351,888 | Stewart | June 20, 1944 |
| 2,506,454 | Holmwood | May 2, 1950 |
| 2,673,327 | Morelock | Mar. 23, 1954 |
| 2,763,935 | Whaley et al. | Sept. 25, 1956 |
| 2,829,340 | Lippke | Apr. 1, 1958 |
| 2,873,425 | Huggins | Feb. 10, 1959 |
| 2,978,636 | Fountain | Apr. 4, 1961 |